Aug. 27, 1935.  J. A. BOUDREAU ET AL  2,012,256
BEARING
Filed May 14, 1931    3 Sheets-Sheet 1

Inventors
Joseph A. Boudreau
William J. Taylor
by Roberts, Cushman & Woodberry
Attys.

Aug. 27, 1935.  J. A. BOUDREAU ET AL  2,012,256
BEARING
Filed May 14, 1931  3 Sheets-Sheet 2
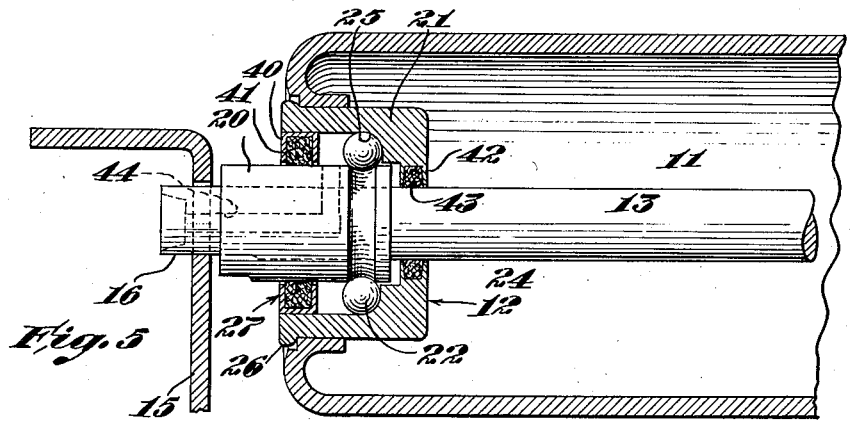
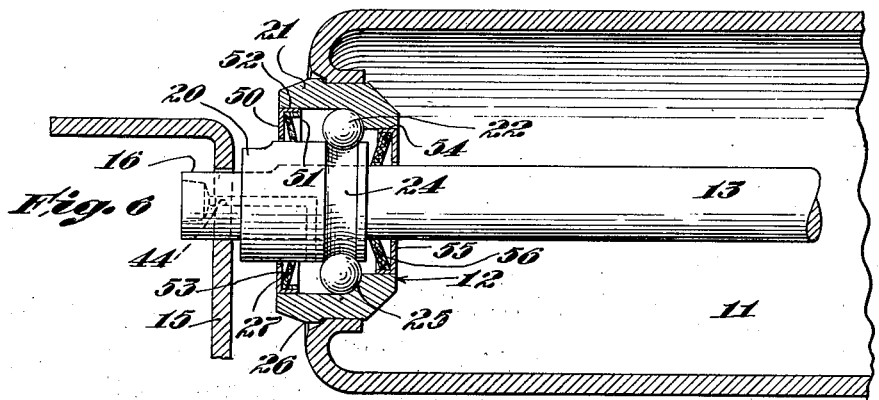
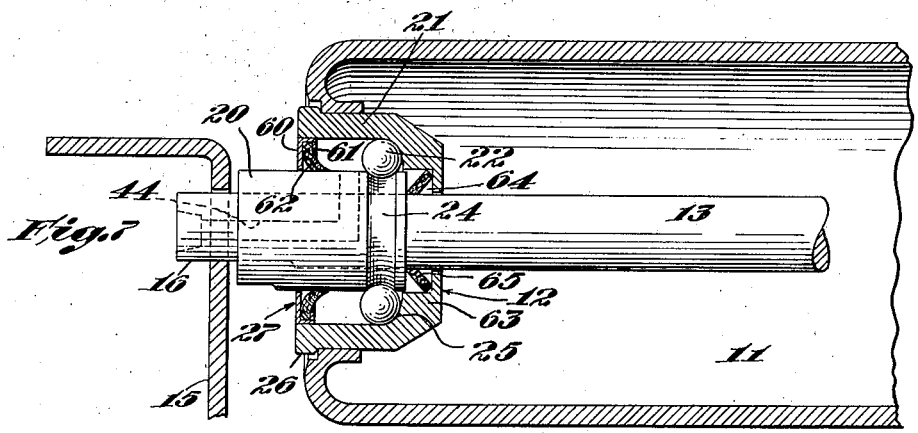

Aug. 27, 1935.   J. A. BOUDREAU ET AL   2,012,256
BEARING
Filed May 14, 1931   3 Sheets-Sheet 3
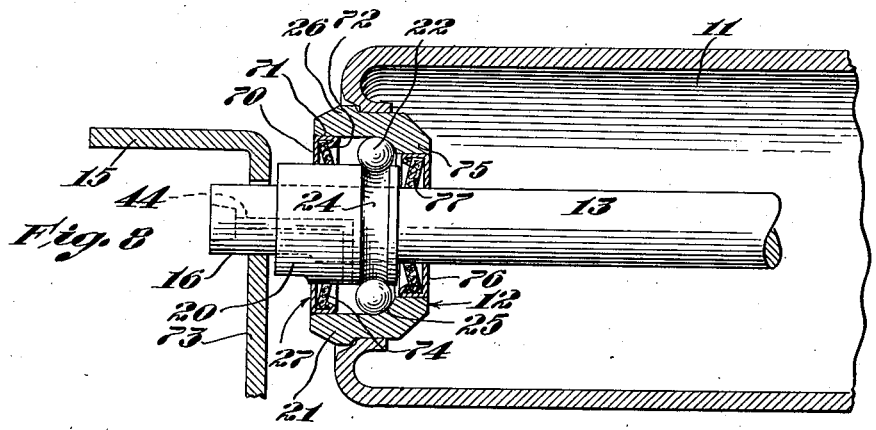
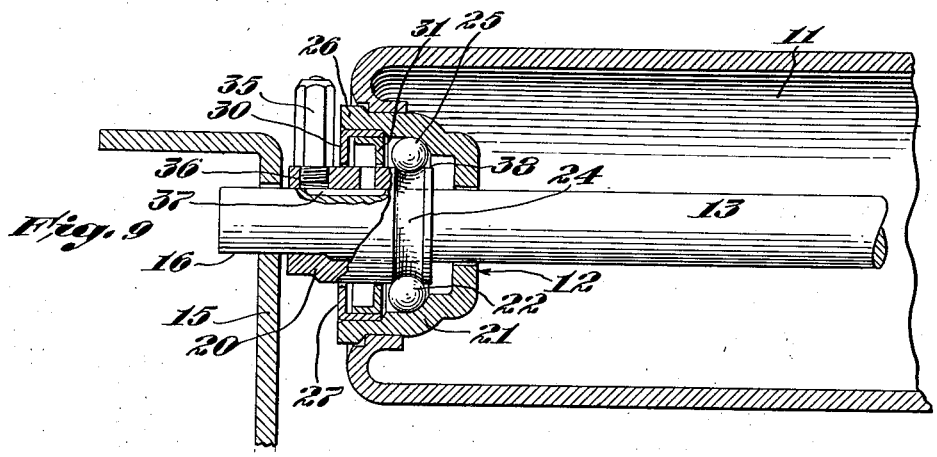
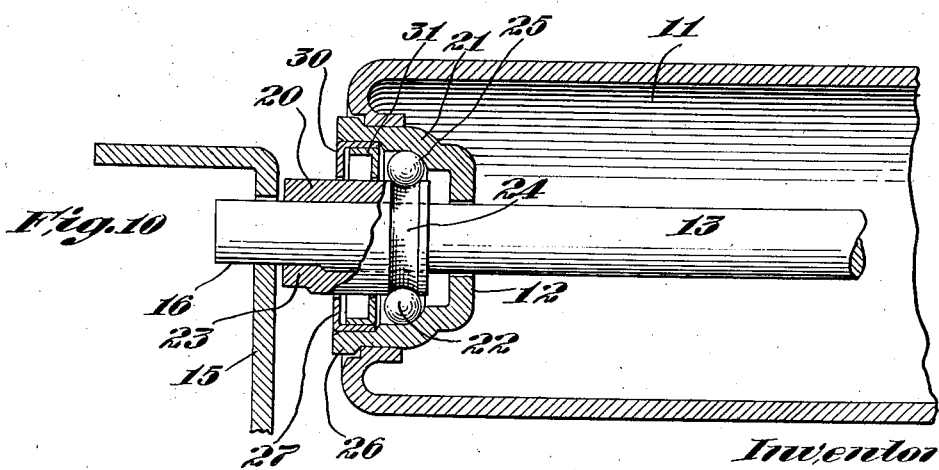
Inventors
Joseph A. Boudreau
William J. Taylor
by Roberts, Cushman & Woodberry
Attys.

Patented Aug. 27, 1935

2,012,256

UNITED STATES PATENT OFFICE 2,012,256

BEARING

Joseph A. Boudreau and William J. Taylor, Syracuse, N. Y., assignors to The Lamson Company, Syracuse, N. Y., a corporation of Massachusetts Application May 14, 1931, Serial No. 537,234

17 Claims. (Cl. 308—20)

This invention relates to an improvement in antifriction bearings one application of which is in connection with conveyor rollers of the type disclosed in the copending application of Lavont C. Allen, filed December 5, 1930 under Serial No. 500,329.

Certain of the objects of this invention are to provide a bearing which includes means to prevent the entry of grit or other friction, means to prevent the escape of lubricant therefrom and means to facilitate the supply of lubricant thereto.

Another object of this invention is to provide in a bearing an inner race through which a shaft or spindle passes, which race and shaft interengage whereby the rotation of the race relative to said shaft or spindle is prevented and a relative longitudinal movement of the shaft or spindle and the race is permitted.

Other objects will appear from a consideration of the following description and of the drawings which form a part thereof and in which:

Figs. 5, 6, 7 and 8 are sectional views similar to Fig. 3 but on a smaller scale illustrating other forms of greased packed bearings embodying this invention;

Fig. 9 is a similar view of an adaption of the bearing shown in Fig. 3 when employed as a grease seal bearing; and Fig. 10 is a view similar to Fig. 9 of the bearing when employed as a free running bearing.

Figure 1:
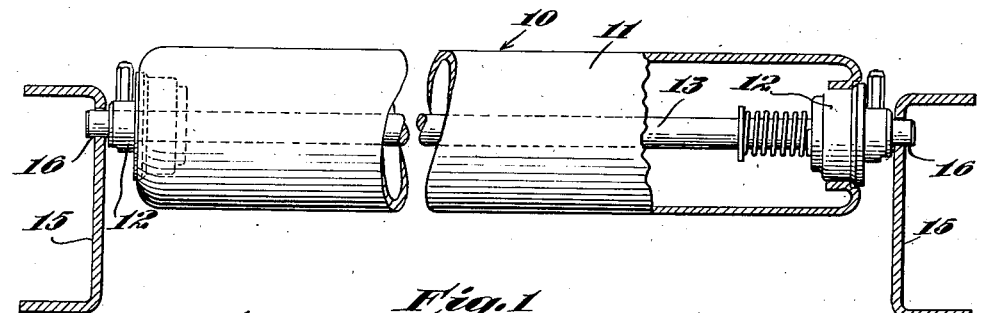
Fig. 1 is a view in elevation with parts broken away of a conveyor roller provided with bearings embodying this invention.
Figure 2:
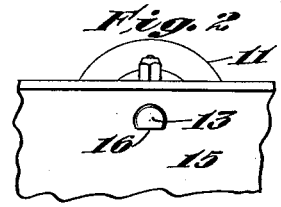
Fig. 2 is a partial side elevation of the roller shown in Fig. 1.

For purpose of illustration the bearing is shown used in a conveyor roller of the type set forth in the above-mentioned application of Lavont C. Allen. The roller 10 comprises a load transporting barrel 11, bearings 12 at each end of the barrel, a cylindrical shaft 13 which passes through the bearings and rests at its ends in openings 14 formed in side rails 15. The openings 14 are irregularly formed as shown in Fig. 2 and each end of the shaft 13 has a flattened portion 16 so that it fits the opening 14 and the shaft is held against rotation. The flattened portions cooperate, as will be set forth hereinbelow, with the bearings 12 and the portion 16 at the right-hand end of the shaft in Fig. 1 is longer than that at the other end so that the shaft can be shifted longitudinally of the bearings and the roller removed from the rails 15 all as set forth at length in the above-mentioned application.

Bearings made in accordance with this invention may be of several types as desired such as, for example, grease packed bearings, grease seal bearings and free running bearings. Figs. 3 to 8 inclusive illustrate various embodiments of the first type, and Figs. 9 and 10 illustrate bearings of the second and third type respectively. In each embodiment the bearing 12 comprises an inner race 20, an outer race 21, and balls 22 between the races. The inner race 20 surrounds the shaft 13 and is deformed at its outer end to provide a flattened surface 23 which coacts with the flattened portion 16 of the shaft (see Fig. 4), so that the race is prevented from rotating independently of the shaft. The central aperture in the race 20 through which the shaft 13 passes is of a diameter sufficiently greater than the shaft diameter that the shaft may be freely shifted longitudinally thereof when the roller is to be removed from the rails.

An annular track 24 of the usual concave contour is formed at the inner end of the race which coacts with a track 25 on the outer race 21 to receive the balls 22. The race 21 is substantially bell-shaped and terminates at its outer end in an annular flange 26 against which one end of the roller barrel 11 bears. Mounted at the outer end of the outer race 21 is a ring 27 which surrounds the inner race 20 and protects the bearing against the entry of unwanted grit and other friction producing material. The outer race 21 and ring 27 are preferably of such dimensions that the race 21 has a press fit in the roller barrel 11 and the ring 27 has a similar fit in the race 21.

Figs. 3 to 8 inclusive illustrate various types of grease packed bearings in which the grease or other lubricant is retained within the bearing by the use of washers of felt or similar material installed at each end of the bearing. Such lubricant is preferably introduced into the bearing under pressure by the use of a grease gun but while the drawings illustrate bearings so adapted it will, of course, be understood that we are not limited to any particular means or method by such illustration and the following description.

Figure 3:
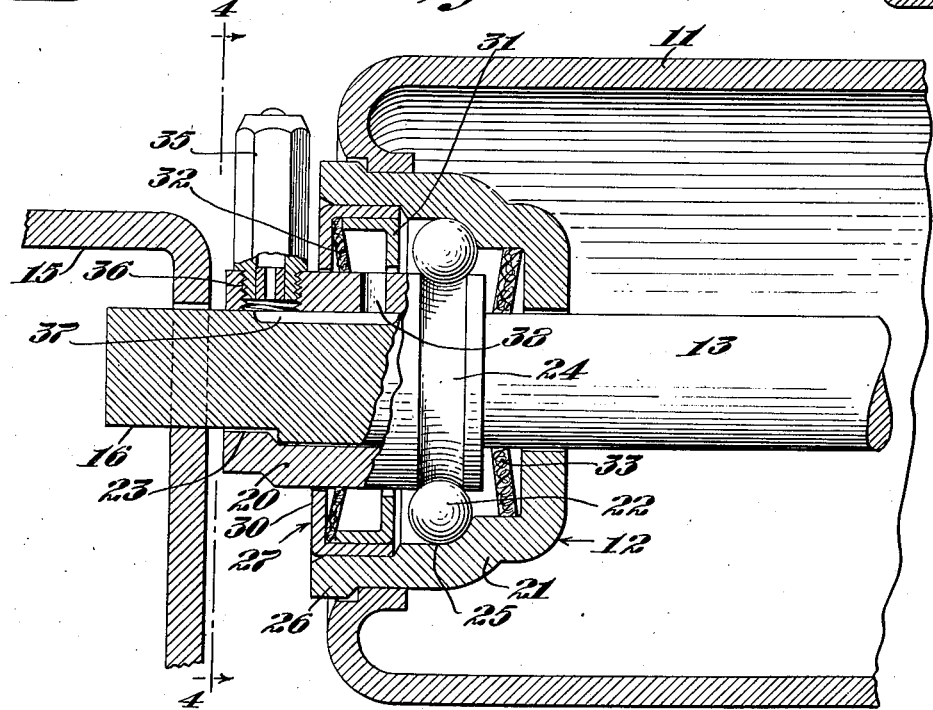
Fig. 3 is an enlarged longitudinal section of one end of a roller and of a greased packed bearing embodying one form of this invention.
Figure 4:
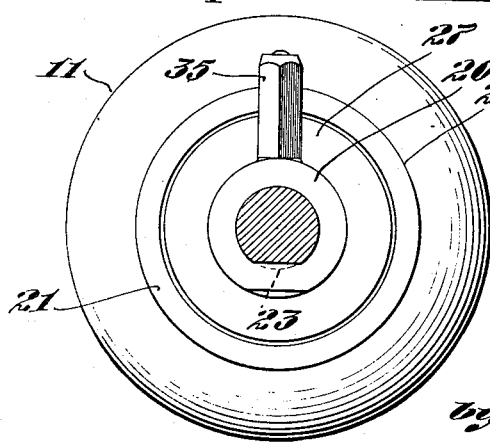
Fig. 4 is an end view on a smaller scale taken along the line 4—4 of Fig. 3.

In the embodiment shown in Figs. 3 and 4 the ring 27 comprises an outer shield 30 and an inner shield 31, which shields may be right angular in cross section, and so dimensioned that the inner shield is pressed into the outer shield and held therein by friction. The shields thus form an annular compartment surrounding the inner race. Enclosed within the ring and held in position in the compartment thereof by the shields is a flexible washer 32 which has a yielding bearing against the stationary inner race 20 and thus prevents the escape of lubricant from the outer end of the bearing. A similar washer 33 is inserted in the outer race 21 beyond the inner race 20 and bears upon the shaft 13 to close the inner end of the bearing and prevent escape of lubricant. In order to facilitate the introduction of lubricant into the bearing there is provided a fitting 35 having a threaded engagement with an aperture 36 in the inner race 20. Formed in the shaft 13 is a channel 37 which connects the aperture 36 with a passage 38 in the race 20 leading from the channel to the ring compartment through which the lubricant enters the bearing between the washers 32, 33.

In the embodiment shown in Fig. 5 the ring 27 is made of a single shield 40 U-shaped in cross section and carries packing material 41 which closes the outer end of the bearing. The outer race 21 is channeled at its inner edge around the shaft 13 to provide a pocket 42 which carries packing material 43 for closing the inner end of the bearing. Lubricant is introduced into the bearing through a channel 44 in the shaft, shown in dotted lines, having an opening at the end of the shaft through which the lubricant is forced into the bearing. Lubricant is similarly introduced into the bearings 12 of the embodiments shown in Figs. 6, 7 and 8 and the reference numeral 44 is applied to the channels there shown without further description thereof.

In the embodiment shown in Fig. 6 the ring 27 comprises an outer shield 50 L-shaped in cross section and a band 51 having a press fit with the flange 52 of the shield. Between the shield 50 and band 51 is clamped a washer 53 to close the outer end of the bearing. The inner end 54 of the outer race 21 is cut away to admit a shield 55, L-shaped in cross section, and having a press fit with the end 54 of the race. A washer 56 supported by the shield 55 bears against the shield and against the shaft 13 to close the inner end of the bearing.

In the embodiment shown in Fig. 7 the ring 27 is a shield 60 of J-shaped cross section, the inner wall 61 being shorter than the outer wall so that a washer 62 carried by the shield may flex inwardly into contact with the race 20. The inner end 63 of the outer race 21 is cut away to form an annular recess 64 in which a washer 65 is seated. It will be apparent that the washers 62 and 65 coact to close the ends of the bearings.

In the embodiment shown in Fig. 8 the ring 27 is a shield 70 substantially L-shaped in cross section terminating at the inner end of the annular wall 71 in a flange 72 which coacts with the vertical wall 73 to secure a washer 74 in place. The inner end 75 of the outer race 20 is cut away to receive a shield 76 similar to the shield 70 and supporting a washer 77 in contact with the shaft 13. As in the other embodiments described the washers 74 and 77 seal the bearing and prevent the escape of lubricant therefrom.

When the bearing shown in Fig. 3 is used, not as a greased packed bearing but as a grease seal bearing the washers 32 and 33 are omitted as shown in Fig. 9. The other elements are retained and accordingly the reference characters applied thereto in Fig. 3 will be applied in Fig. 9 without any specific description thereof. The center aperture in the inner shield 31 of the Fig. 9 bearing through which the inner race 20 passes is preferably of a diameter less than the diameter of the corresponding element in the Fig. 3 bearing. When the bearing shown in Fig. 3 is used as a dry, free running bearing the fitting 35 and other lubricating elements shown in Fig. 3 are omitted as are the washers 32 and 33. The shields 30 and 31 however are retained as will appear from an examination of Fig. 10 wherein the bearing shown in Fig. 3 is illustrated as adapted for use as a dry, free running bearing.

While various embodiments of this invention have been shown and described as employed in a conveyor roller it will be understood that we are not limited to these embodiments or to this particular application thereof and that other embodiments and applications of the invention may be made without departing from the spirit and scope thereof as set forth in the following claims.

We claim:
1. A bearing for rollers and the like comprising an inner race, an outer race, anti-friction means between said races, a ring carried by one of said races and terminating adjacent the other of said races for preventing the entry of grit or other friction causing material in combination with a shaft passing through said bearing and having a channel therein, and means including a fitting mounted upon said inner race for introducing lubricant through said channel under pressure into said bearing.

2. A bearing for rollers and the like comprising an inner race, an outer race, anti-friction means between said races, a ring carried by one of said races and terminating adjacent the other of said races for preventing the entry of grit or other friction causing material, said ring comprising an inner and an outer shield defining an annular compartment around the inner race, and means for introducing lubricant under pressure into said compartment.

3. A bearing for rollers and the like comprising an inner race, an outer race, anti-friction means between said races, a ring carried by one of said races and terminating adjacent the other of said races for preventing the entry of grit or other friction causing material, said ring comprising an inner and an outer shield defining an annular compartment around the inner race, and means including a fitting upon the inner race for introducing lubricant under pressure into said compartment.

4. A bearing for rollers and the like comprising an inner race, an outer race, anti-friction means between said races, a ring carried by one of said races and terminating adjacent the other of said races for preventing the entry of grit or other friction causing material, said ring comprising an inner and an outer shield defining an annular compartment around the inner race in combination with a shaft passing through said bearing and means coacting with said shaft for introducing lubricant under pressure into said compartment.

5. A bearing for rollers and the like comprising an inner race, an outer race, anti-friction means between said races, a ring carried by one of said races and terminating adjacent the other of said races for preventing the entry of grit or other friction causing material, said ring comprising an inner and an outer shield defining an annular compartment around the inner race in combination with a shaft passing through said bearing and having a channel therein, a passage through the inner race connecting said channel and said compartment and a fitting mounted upon said inner race for introducing lubricant under pressure into said compartment through said channel and said passage.

6. A bearing for rollers and the like comprising an inner race, an outer race, anti-friction means between said races, a ring carried by the outer race, said ring surrounding and terminating adjacent the inner race for preventing entry of grit or other friction causing material, and a washer carried by said ring in contact with said inner race in combination with a shaft through said bearing, a washer between said outer race and said shaft and means for introducing lubricant under pressure into said bearing between said washers.

7. A bearing for rollers and the like comprising an inner race, an outer race, anti-friction means between said races, a ring carried by the outer race and terminating adjacent the inner race for preventing entry of grit or other friction causing material, and a washer carried by said ring in contact with said inner race in combination with a shaft through said bearing, and a washer between said outer race and said shaft, said shaft having a channel therein through which lubricant is introduced under pressure into said bearing between said washers.

8. A roller conveyor mechanism comprising a shaft, having at each end a flattened portion, a barrel rotatable about the shaft, bearings between said barrel and said shaft, each bearing comprising an outer race carried by the barrel, an inner race carried by the shaft and anti-friction means between said races, the inner race being deformed adjacent one end to provide a flattened surface which engages the flattened portion at one end of the shaft to fix the race against rotation relative to the shaft, and means carried by said inner race for lubricating said bearings.

9. A roller conveyor mechanism comprising a shaft, having at each end a flattened portion, a barrel rotatable about the shaft, bearings between said barrel and said shaft, each bearing comprising an outer race carried by the barrel, an inner race carried by the shaft and anti-friction means between said races, the inner race being deformed adjacent one end to provide a flattened surface which engages the flattened portion at one end of the shaft, to fix the race against rotation relative to the shaft, and means for lubricating said bearings including a fitting carried by said race and a channel in the shaft leading from the fitting toward the anti-friction means.

10. A conveyor roller mechanism comprising a shaft having at each end a flattened portion, a barrel rotatable about the shaft, bearings between said barrel and said shaft, each bearing comprising an outer race carried by the barrel, an inner race surrounding and carried by the shaft and anti-friction means between said races, said inner race projecting at one end beyond said barrel and including means at said projecting end for engaging a flattened end of the shaft to prevent relative rotation of the shaft and inner race and means for lubricating the anti-friction means of the bearing including a passage leading completely through the wall of the inner race from the shaft side thereof.

11. A conveyor roller mechanism comprising a shaft having at each end a flattened portion, a barrel rotatable about the shaft, bearings between said barrel and said shaft, each bearing comprising an outer race carried by the barrel, an inner race surrounding and carried by the shaft and anti-friction means between said races, said inner race projecting at one end beyond said barrel and including means at said projecting end for engaging a flattened end of the shaft to prevent relative rotation of the shaft and inner race and a fitting on the projecting end of said inner race and a channel in said shaft leading from said fitting to said passage.

12. A conveyor roller mechanism comprising a shaft having at each end a flattened portion, a barrel rotatable about the shaft, bearings between said barrel and said shaft, each bearing comprising an outer race carried by the barrel, an inner race surrounding and carried by the shaft and anti-friction means between said races, said inner race projecting at one end beyond said barrel and including means at said projecting end for engaging a flattened end of the shaft to prevent relative rotation of the shaft and inner race and means carried by the projecting end of the inner race for lubricating the anti-friction means of the bearing.

13. A conveyor roller mechanism comprising a shaft having at each end a flattened portion, a barrel rotatable about the shaft, bearings between said barrel and said shaft, each bearing comprising an outer race carried by the barrel, an inner race surrounding and carried by the shaft and anti-friction means between said races, one end of the inner race projecting beyond said barrel and being deformed to provide a flattened surface which engages the flattened portion at one end of the shaft, and a fitting mounted upon the projecting end of the inner race by which said bearing is lubricated.

14. A conveyor roller mechanism comprising a shaft having at each end a flattened portion, side rails having irregularly formed openings therein which receive the flattened ends of the shaft and prevent the rotation thereof, a barrel rotatable about the shaft and bearings between said barrel and said shaft, each bearing comprising an outer race carried by the barrel, an inner race carried by the shaft and anti-friction means between said races, said inner race including means engaging a flattened end of the shaft to prevent relative rotation of the shaft and inner race and to limit relative longitudinal movement thereof in one direction.

15. A conveyor roller mechanism comprising a shaft having at each end a flattened portion, side rails having irregularly formed openings therein which receive the flattened ends of the shaft and prevent the rotation thereof, a barrel rotatable about the shaft and bearings between said barrel and said shaft, each bearing comprising an outer race carried by the barrel, an inner race carried by the shaft and anti-friction means between said races, said inner race being deformed adjacent one end to provide a flattened surface which engages the flattened portion at one end of the shaft to prevent relative rotation of the shaft and inner race and to limit relative longitudinal movement thereof in one direction.

16. A conveyor roller mechanism comprising a shaft having at each end a flattened portion, a barrel rotatable about the shaft and bearings between said barrel and said shaft, each bearing comprising an outer race carried by the barrel, an inner race carried by the shaft and anti-friction means between said races, said inner race including means engaging a flattened end of the shaft to prevent relative rotation of the shaft and inner race and to limit relative longitudinal movement thereof in one direction.

17. A conveyor roller mechanism comprising a shaft having at each end a flattened portion, a barrel rotatable about the shaft and bearings between said barrel and said shaft, each bearing comprising an outer race carried by the barrel, an inner race carried by the shaft and anti-friction means between said races, said inner race being deformed adjacent one end to provide a flattened surface which engages the flattened portion at one end of the shaft to prevent relative rotation of the shaft and inner race and to limit relative longitudinal movement thereof in one direction.

JOSEPH A. BOUDREAU.
WILLIAM J. TAYLOR.